G. MELLEN.
MELTING FURNACE.
APPLICATION FILED OCT. 10, 1912.

1,092,938.

Patented Apr. 14, 1914.

Witnesses:
Joseph W. Harris
Robert J. Hulsizer

Grenville Mellen
Inventor:
by Byrnes, Townsend & Bickerstein
Att'ys.

UNITED STATES PATENT OFFICE.

GRENVILLE MELLEN, OF EAST ORANGE, NEW JERSEY, ASSIGNOR OF ONE-HALF TO UNITED ALUMINUM INGOT COMPANY, A CORPORATION OF NEW YORK.

MELTING-FURNACE.

1,092,938.

Specification of Letters Patent.

Patented Apr. 14, 1914.

Application filed October 10, 1912. Serial No. 725,061.

*To all whom it may concern:*

Be it known that I, GRENVILLE MELLEN, a citizen of the United States, residing at East Orange, in the county of Essex and State of New Jersey, have invented certain new and useful Improvements in Melting-Furnaces, of which the following is a specification.

My invention relates to a combined stack and reverberatory furnace, preferably heated by oil or gas, but which can be heated by coal, as in other reverberatory furnaces, the waste heat passing through the stack which constitutes the charging hopper for metal or other material to be melted.

The object of my invention is to provide a furnace that will melt metals or other materials with a higher fuel economy than has been heretofore obtained in melting furnaces, and that is continuous in its action.

Figure 1:
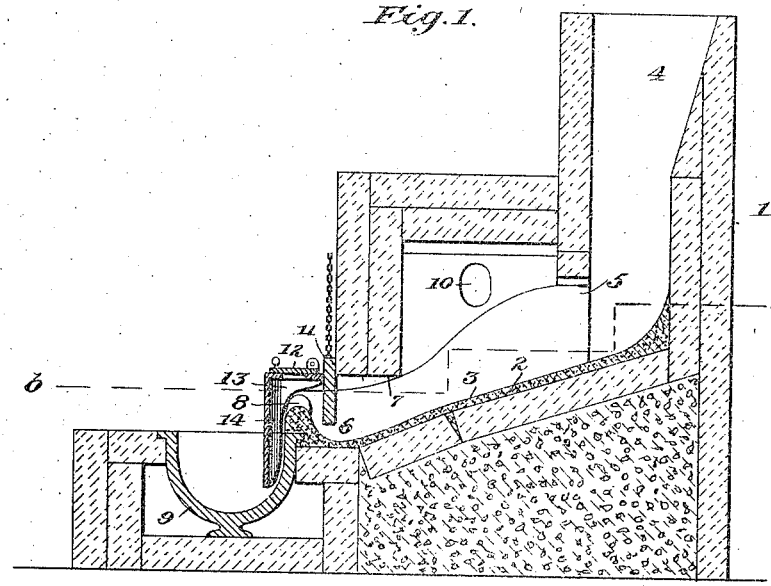
Figure 2:
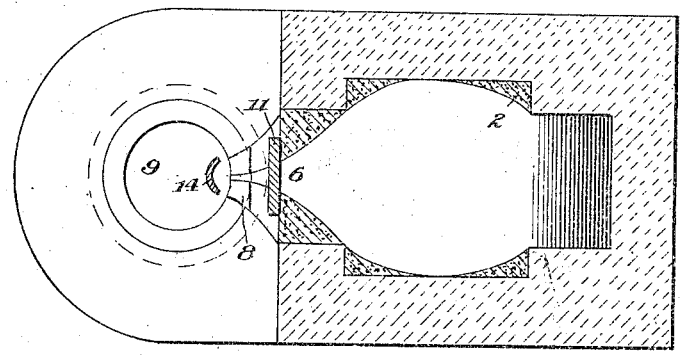

In the accompanying illustration, Figure 1 is a vertical section of the furnace; and Fig. 2 is a horizontal section along the line *b—b* of Fig. 1.

A reverberatory furnace 1, lined with a suitable refractory material 2, has an inclined hearth 3 which communicates at its upper end with a stack 4, by way of an arch 5. Its lower end communicates with a sump 6 below an arch 7, the outer wall 8 of the sump leading into a receiving pot 9. A suitable opening 10, in a wall of the furnace admits flame from an oil-burner, gas burner, coal furnace, or other source of heat; the particular means used for heating the furnace being immaterial. The products of combustion, waste heat, etc., pass through the arch 5 and out of the stack 4. Metal or other material to be melted, such as glass, etc., is charged into the stack 4, either at the top or through a suitable charging door. The charge, preferably of broken material, scrap, etc., provides many passages between the many pieces, and the heated gases, flame, etc., passing therethrough heats the charge until that at the lower part of the stack melts and is drained off through the reverberatory furnace into the sump 6, over the wall 8, and into the receiving pot 9; the charge settling in the stack and being replenished as fast as it melts away. Scrap metal as purchased in the open market, often contains pieces of foreign metal, *e. g.*, scrap brass frequently contains lumps of iron, etc.; such lumps of foreign metal are carried down the inclined hearth and collect in the sump 6, the heavy pieces settling, and the lighter material floating on the top, but intercepted by the vertically movable shield 11 of graphite, fire-brick, etc. The melted metal or other material, after filling the sump, passes over the overflow wall 8, and into the receiving pot 9. A door 12 gives access to a refining chamber 13, through which a rake or other tool may be inserted to remove the foreign material in the sump, and further serves as a means for adding fluxes or other refining chemicals to the metal in the sump or the receiving pot. The refining chamber which consists of the space 13 including that part of the sump to the left of the shield 11 and the part of the pot within the shield 14, is suitably closed on its outer side by a shield 14 which serves to prevent loss of heat, and further to keep the fluxes, etc., from floating over the exposed part of the pot.

It is to be noted that the metal in the sump is kept hot, since it is exposed to the heat of the reverberatory chamber, the sliding shield 11 preventing loss of heat, since it dips into the metal in the sump.

The melted metal absorbs considerable heat while passing through the reverberatory chamber 1, but owing to the inclined hearth, it does not remain in the reverberatory chamber long enough to become oxidized; the operation is continuous so long as material to be melted is supplied to the stack as fast as it melts away. Owing to the absence of any great weight of metal in the reverberatory chamber, this part of the furnace is not subjected to the wear it would otherwise be subjected to, and further, it may be of a size just large enough to afford complete combustion of the fuel. The temperature within the reverberatory furnace is, of course, to be maintained above that at which the material to be melted melts, so that the molten material will remain melted long enough to be ladled from the receiving pot.

I claim:

In a melting furnace, the combination of an upwardly projecting stack, a reverberatory furnace at the base of said stack having a sloping bottom and constituting a continuation of said stack and connected thereto by an inclined base, a sump at the other end of said reverberatory furnace, a movable shield dipping into said sump, a receiving pot, a refining chamber comprising a portion of said sump and a portion of said pot, and a removable cover for said refining chamber.

In testimony whereof I affix my signature in presence of two witnesses.

GRENVILLE MELLEN.

Witnesses:
　JOHN O. BIGELOW,
　STUART A. YOUNG.